United States Patent [19]
Poor

[11] Patent Number: 6,028,857
[45] Date of Patent: Feb. 22, 2000

[54] SELF-ORGANIZING NETWORK

[75] Inventor: Robert D. Poor, Cambridge, Mass.

[73] Assignee: Massachusetts Institute of Technology, Cambridge, Mass.

[21] Appl. No.: 08/899,782

[22] Filed: Jul. 25, 1997

[51] Int. Cl.[7] .................................... H04J 3/24
[52] U.S. Cl. .......................... 370/351; 370/400
[58] Field of Search .................. 370/351, 252, 370/254, 256, 349, 350, 389, 352, 353, 395, 400, 392; 455/445

[56] References Cited

U.S. PATENT DOCUMENTS

| | | | |
|---|---|---|---|
| 5,608,721 | 3/1997 | Natarajan et al. | 370/351 |
| 5,719,861 | 2/1998 | Okanoue | 370/351 |

OTHER PUBLICATIONS

Radia Perlman, Interconnections: Bridges and Routers, pp. 211–223.

Dube R. et al. "Signal Stability–Based Adaptive Routing (SSA) For Ad Hoc Mobile Networks", IEEE Personal Communications, Vo. 4, No. 1, Feb. 1997, pp. 36–45,.

Balasubramanian Rajogopalan et al. "A New Responsive Distrubted Shortest–Path Routing Algorithm*", Computer Communcations Review, Vo. 19, No. 4, Sep. 1, 1989, pp. 237–246.

*Primary Examiner*—Dang Ton
*Assistant Examiner*—Tuan Q. Ho
*Attorney, Agent, or Firm*—Cesari and McKenna

[57] ABSTRACT

A self-organizing wireless network includes a plurality of nodes, each of which is configured to originate messages, be a destination of messages and relay messages. Each message is transmitted in a frame that includes the cost of conveying the message to the destination node for the message and also the cost so far expended in the conveying of the message. Each time the message frame is transmitted, either by the originating node or by a relaying node, the node ascertains whether the cost to convey the message from that node to the destination node is less than the conveying cost contained in the received frame. If it is, the node retransmits the frame after having incremented the incurred cost by the relay cost of that node and decremented the cost to convey by the same value. Otherwise the node discards the message.

3 Claims, 4 Drawing Sheets

SELF-ORGANIZING NETWORK

BACKGROUND OF THE INVENTION

This invention relates to a self-organizing, wireless digital network. More specifically, it relates to a wireless network in which each node communicates directly only with neighboring nodes, the latter nodes relaying transmissions to more distant nodes. In one application of the invention, each node has a low-power transmitter and its neighboring nodes are only a few meters distant.

In one aspect the invention is directed at networks comprising a large number of nodes in relatively close proximity to each other. A typical application is an office environment in which a number of workstations and servers are linked in a local area network (LAN). Conventionally, these nodes are interconnected by cables, usually through a central hub. Installation of the cables is a material element of cost in these networks. Moreover, cabled networks are relatively inflexible in that a node usually cannot be moved from one location to another without installing a new cable. Furthermore, it is particularly expensive to install cables in completed structures, since they cannot be hidden from sight without "fishing" them through the spaces between walls or, in some cases, opening up the walls to gain access to the interiors.

The foregoing problems have been overcome in part by resort to wireless LANs, which replicate the conventional wired arrangements, e.g. ethernet and token ring, but without the use of cables. Each of the nodes includes a wireless transceiver which communicates with other nodes in the network by means of radio frequency signals. These networks eliminate the installation costs associated with wired networks and, furthermore, they provide substantially more flexibility with regard to location and relocation of the respective network nodes. Even so, the cost of these wireless networks is too high for some applications. For example, one might wish to use a network to interconnect large numbers of low-cost devices such as simple condition sensors and controllers and, in that case, the network interface of each node might well exceed the cost of the device. This problem would be even more acute in a home environment where the cost cannot be justified by possible savings that might be obtained in a commercial environment.

There are other arrangements which can be applied to wireless networks and, particularly, to networks that employ very short-range, and therefore low-cost transceivers. These are ad-hoc routing systems which generally fall under the category of "Link State Routing" and "Source Path Routing".

In Link State Routing each node maintains a routing table that specifies an "optimal" path toward each network destination. The meaning of "optimal" is generally interpreted to mean the shortest path, but may account for other factors such as load balancing.

When a node in a Link State Routing system is to transmit a message to a destination node, it first fetches from a routing table an entry for the specified destination. The routing table entry specifies which neighbor of the originating node should relay the message and the identification of that neighbor is installed in the message header as the recipient. The originating node then broadcasts the message. Of all the neighbors that receive the broadcast, only the specified recipient acts on the message, relaying the message in the same manner, according to the entry in its routing table corresponding to the destination node. This process continues until the message reaches the ultimate destination.

In Source Path Routing, the originating node enters the entire route of the message into the message header, identifying each node through which the message should be relayed in order to reach the destination node. If a receiving node is not the last named node in the message's source route, it simply relays the message to the next node on the route.

Both Link State Routing and Source Path Routing require that each node in the network keep a constant record of its neighboring nodes and, furthermore, that it broadcast any changes in its list of neighboring nodes. This requires that each node send periodic messages to each of its neighbors. All of these messages are generally undesirable since they consume power and system bandwidth. Moreover, they may facilitate the ability of eavesdroppers to ascertain system information, including the locations of individual nodes. These systems are also susceptible to breakdown resulting from errors in the transmission of neighboring-node information to the other nodes in the network.

It is therefore a principal object of the invention to provide a digital network having a relatively low cost per node. Another object of the invention is to provide a network that is completely flexible with regard to location, relocation and addition of network nodes. A further object is to provide a robust network that consumes relatively little power and bandwidth in establishing routing configuration and is also relatively immune to problems that cause failures of prior networks.

SUMMARY OF THE INVENTION

A network incorporating the invention is a wireless network that uses an ad-hoc "contour" routing algorithm which allows a message to reach its destination, even when the network topology is incompletely described or rapidly changing. The nodes do not maintain routing tables, but rather cost tables that indicate the "costs" of transmission to other nodes in the network.

For example, assume that node A is separate from node B by several intermediate nodes and that node A is to send a message to node B. Node A cannot reach node B directly. However, it has stored information from previously received messages that node B is four hops away. Node A sends the message to all its neighbors, the message being encapsulated in a network level frame that says, in effect, "forward this message to node B if you can do so in fewer than four hops." All of node A's immediate neighbors receive the message, since the RF transmissions are essentially omnidirectional, but only those nodes that are "closer" to node B will be able to deliver the message in three hops or fewer. Those that are "farther away" would require five hops, for example. Thus, those neighbors that are "on the way" to node B relay the message. In this case the message is encased in a frame that says, in effect, "forward this message to node B if you can do so in two hops or fewer". The process continues until the message reaches node B.

With this process, the intermediate nodes between node A and node B can also keep track of the return path to node A. When originating node A transmits the message, each of its neighbors makes an entry in a cost table to the effect that node A is one hop away. The cost tables in the second tier of intermediate nodes are updated with entries to note that node A is two hops away. This process continues, so that by the time the message arrives at its destination, node B and all the intermediate nodes have retained entries indicating the number of hops to send a message to node A.

As stated above, each of the nodes maintains a table of the number of hops to each of the other nodes in the system.

However, this information is not available when the network is installed and it is also unavailable when nodes are added to the network or physically moved to new locations. Accordingly, a flooding algorithm is used when the originating node does not include in its cost table the number of hops to a destination node. Specifically, the originating node sends a flood message. This message is relayed once by every node in the network and therefore is guaranteed to eventually find its way to the destination node. The destination node will usually receive replicas of the message over multiple paths. Each replica includes in its frame the number of hops it has traversed since leaving the originating node. Accordingly, the destination node can return a message to the originating node specifying, as the number of hops, the smallest number that was associated with one of the received replicas of the flood message. In the same manner, each of the nodes through which the flood message passed on the way to the destination node now has information concerning the shortest number of hops to the originating node and can make the appropriate entry in its cost table.

If a node has physically moved so that the cost tables in other nodes are no longer valid, the need to update the cost tables will be ascertained when another node attempts to send a message to that node. The number of hops specified in the message may be exhausted before the message reaches the destination node. The message may therefore not reach the destination node and the originating node will then not receive an acknowledgement of receipt of the message. The originating node can then employ the flood algorithm to update the cost tables.

While the foregoing description uses the number of hops on the routing-path as the "cost" criterion, that number is but one example of the cost of transmission. The cost of a hop involving a particular node might be related to other factors, such as the traffic involving that node. In the latter circumstance, a node's cost may change from time to time and this will automatically be reflected in the cost information stored at the other nodes in the network.

It will be apparent from the foregoing that the invention provides a number of important advantages over prior networks. For example, at the physical level, very low-power, localized transmitters can be used in office or home applications. This results in lower hardware costs and low per-node power requirements. Moreover, because of the short range of each RF transmission, the invention provides better utilization of available bandwidth than systems using higher-power transmitters. Additionally, the contour routing technique requires significantly less storage and computation than the Link State Routing and Source Path Routing algorithms.

Furthermore, the contour routing technique supports fully distributed routing algorithms. The network creates its own infrastructure. New nodes may be added simply by introducing them into the system. There is no transmission of network setup and routing information with its consequent overhead and risk of failure from erroneous routing information.

Also, assuming that each node has at least two immediate neighbors, the system is not subject to single-point failures. If a node fails, the network will automatically reconfigure the cost tables as required in order to relay messages from one node to another.

It will be apparent that the advantages of the invention also apply to higher-power networks in which the nodes are more distant from their neighbors. For example a wireless telephone network operating in accordance with the invention might have nodes whose neighbors are hundreds or thousands of meters distant. The individual nodes would be identified by conventional telephone numbers and users would "dial" the numbers of other nodes in placing calls to them. One or more of the nodes might serve as gateways to other telephone networks and these nodes would respond to conventional prefixes indicating calls to nodes in the other networks.

This arrangement provides a low-cost, self-organizing telephone network which does not require investment in, and maintenance of, a central switch. Moreover, communication with a distant node by multiple hops, as contemplated with the present invention, will generally use a series of low-power transmissions requiring lower overall power than a direct transmission to that node. This conserves battery energy for those nodes that are battery-powered and it also conserves radio-frequency spectrum by largely limiting the range of the transmissions in the area covered by the network.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
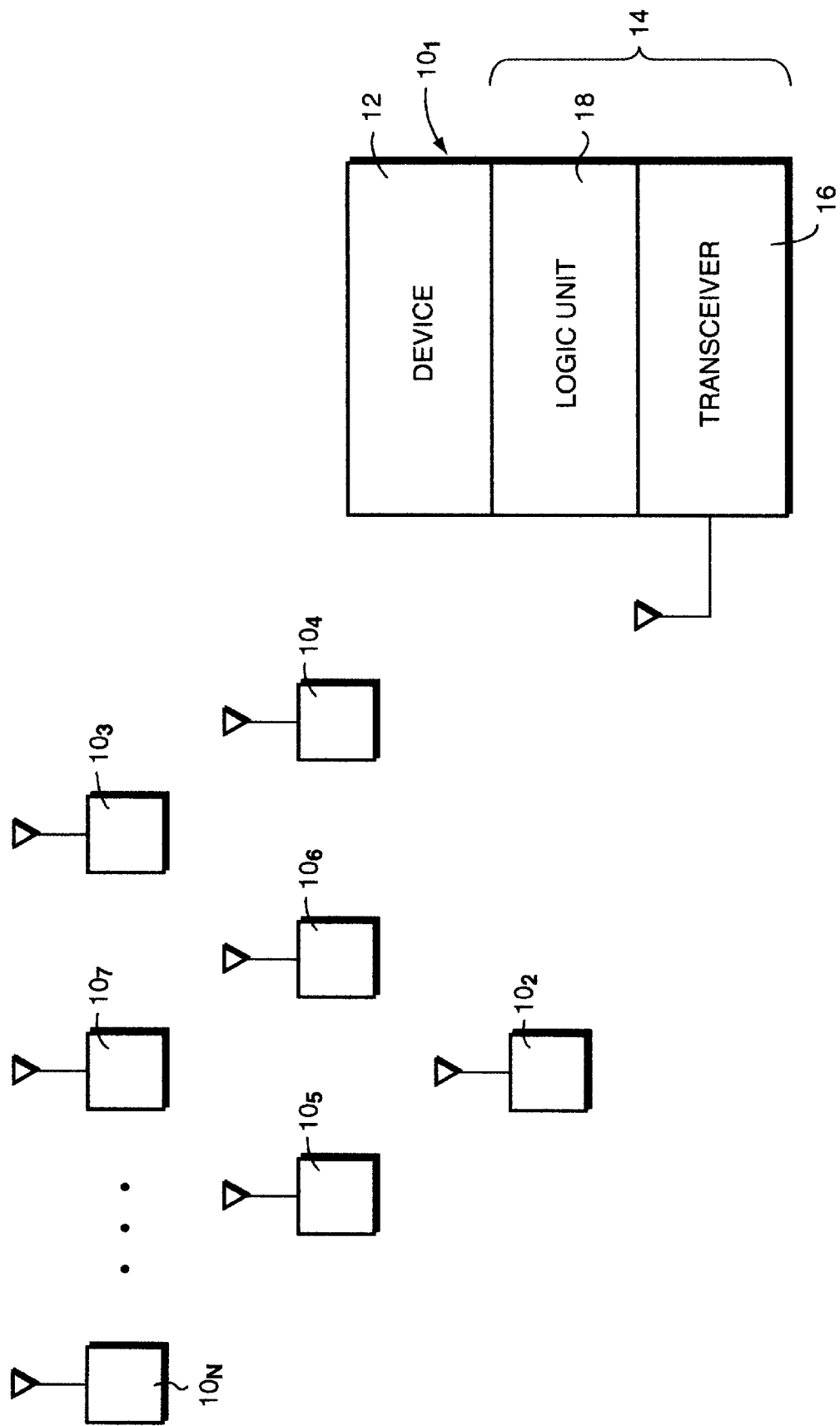
FIG. 1 is a diagram of a network incorporating the invention.

As shown in FIG. 1, a network incorporating the invention comprises a plurality of nodes $10_1 \ldots 10_N$, each of which communicates with other nodes in the network by means of wireless transmissions. As indicated at the node $10_1$, each of the nodes includes a data originating and/or receiving device 12 coupled to a network interface unit 14. The device 12 can be any of the devices interconnected in a network. For example, there may be workstations, file servers, bridges to other networks, etc. Additionally, with the low-cost interface units 14 described herein, the devices 12 can economically be relatively low-cost devices such as condition sensors, controllers and the like which may be deployed in the home as well as in commercial and industrial environments.

Each of the network interface units includes a radio frequency transceiver 16 and a logic unit 18. In the foregoing environments, the transceiver 16 includes a transmitter (not shown) of very low power, e.g. microwatts, and thus can effect communications directly only with immediate neighbors of the node, that is, other nodes that are physically proximate, e.g. within a distance of a few meters. Accordingly, a transmission from a node to most of the other nodes in the network will be a multiple-hop transmission by way of intervening nodes, each of which communicates directly only with its immediate neighbors.

The logic unit 18 has a conventional physical architecture. Thus it includes a microprocessor, a program store and a random access memory. The unit 18 appropriately frames outgoing messages from the device 12 for transmission by the transceiver 16 and processes messages received by the transceiver 16 for delivery to the device 12. The logic unit implements the procedures of the present invention in transmitting, receiving and relaying messages. It may also perform conventional higher-level functions.

Figure 2:
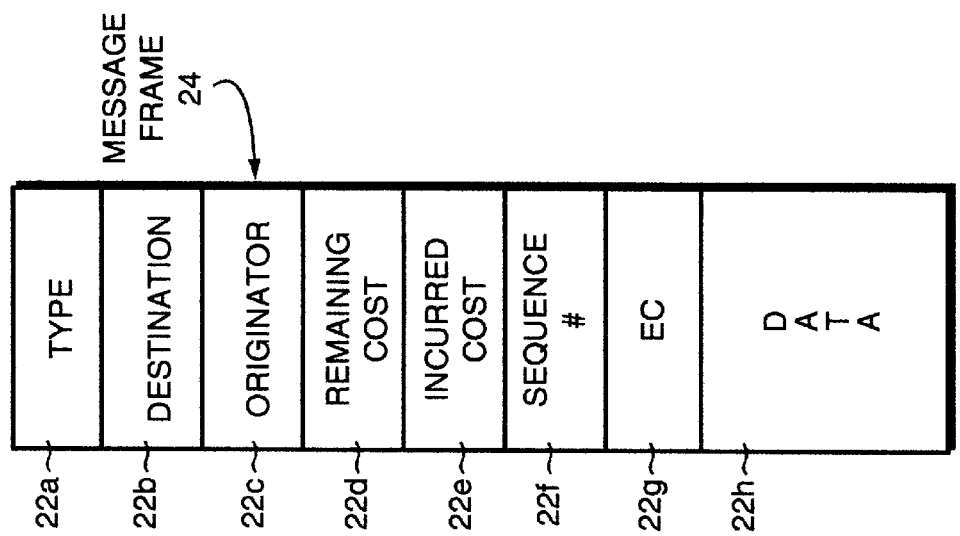
FIG. 2 illustrates the format of a network layer level frame used in transmitting messages between the network nodes.

FIG. 2 illustrates a network layer frame 22 that can be used by the network nodes operating in accordance with the invention. Each frame includes a type field 22a indicating whether the transmission is (1) a point-to-point transmission which is to take the optimum route to the message destination or (2) a flood transmission to be used when the optimum route is unknown. A destination field 22b contains the identification of the destination node and an originator field 22c identifies the originating node. A remaining cost field 22d indicates the remaining allowed cost of the transmission and an incurred cost field 22e indicates the cost incurred at any point in the transmission. A sequence field 22f contains a sequence number of transmissions from the originating node and, preferably, a CRC field 22g contains an error correction bit sequence. Finally, the frame includes a data field 22h containing the data being transmitted, this data including higher level framing information.

Figure 3:
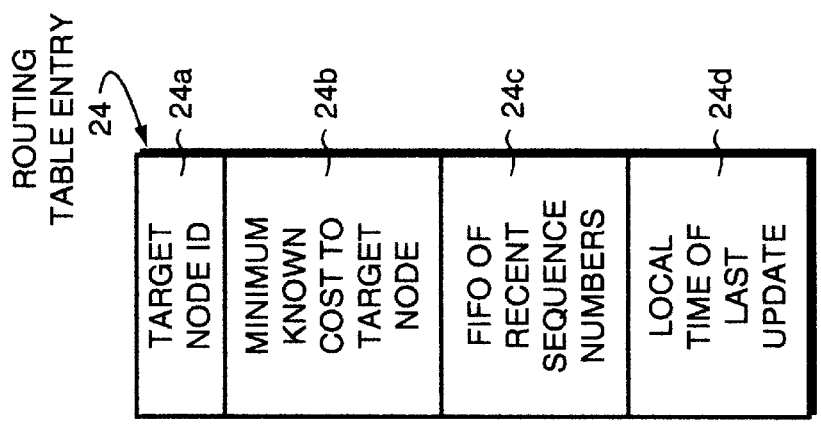
FIG. 3 illustrates the contents of the entries in the cost tables contained in the network nodes.

In its random access memory, the logic unit 18 (FIG. 1) stores a cost table. This table contains a set of entries 24 as illustrated in FIG. 3. Each of these entries includes a field 24a containing the identification of a target node, a field 24b specifying the minimum known cost of a transmission to the target node, a field 24c containing a list of the most recent sequence numbers of transmissions received from the target node, and a field 24d indicating the local time at which the entry was last updated.

Figure 4:
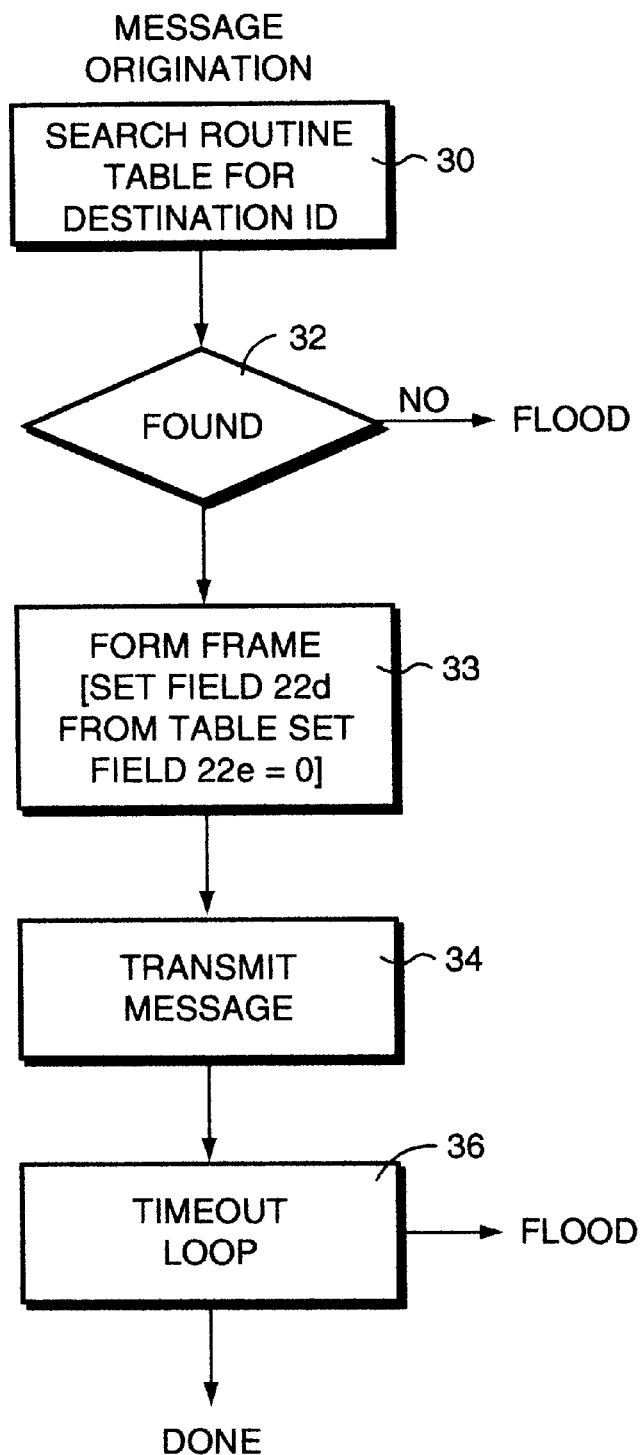
FIG. 4 is a flow diagram of the operations performed by a network node for transmission of a message.

In FIG. 4, I have illustrated the procedure undertaken by a logic unit 18 (FIG. 1) for the transmission of a message. At step 30, the logic unit searches its cost table for an entry in which the intended recipient of the message is identified in the target ID field 24a. If an entry is not found, the procedure branches at step 32 to a flood routine described below. If an entry is found, the logic unit forms a frame 22 at step 33. Specifically, it retrieves from the field 24b in the cost table entry the cost for a transmission to the intended recipient and inserts that value into the field 22d of the frame. It sets the incurred cost to zero to frame 22e. It inserts the node's next sequence number into the frame field 22f, adds the CRC field 22F and data field 22g, and sends the completed frame to the transceiver 16 at step 34 for transmission. The logic unit may then proceed to an acknowledgement loop 36 in which it waits for an acknowledgment from the intended message recipient. If an acknowledgement is received within a predetermined time the transmission process terminates. If it is not, the logic unit branches to the flood transmission procedure. The loop 36 may alternatively be implemented at a higher level protocol layer.

Figure 5:
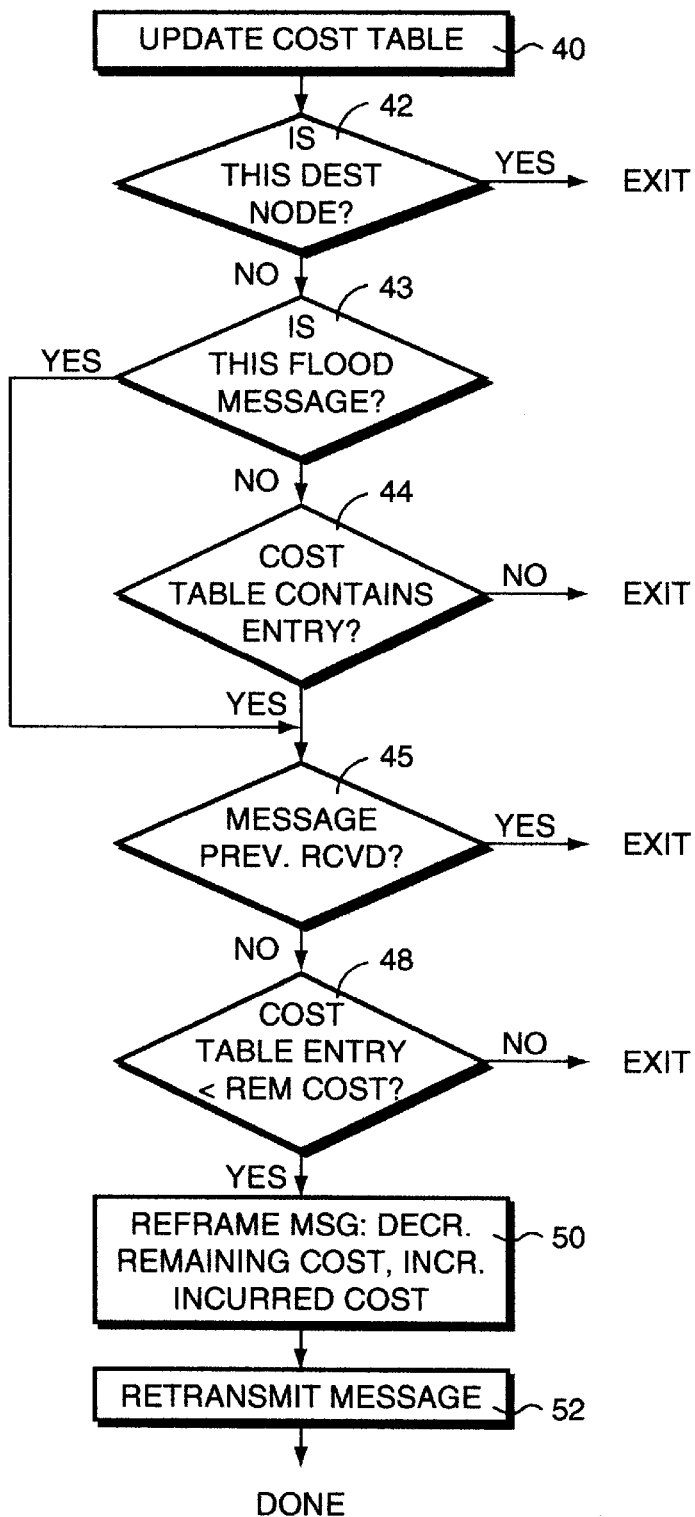
FIG. 5 is a flow diagram illustrating the operations performed by a node upon reception of a message.

Messages received by a node are processed by the logic unit 18 as illustrated in FIG. 5. At step 40, the logic unit updates the entry in its cost table corresponding to the originating node. Specifically, it updates the cost field in accordance with the incurred cost in the header field 22e; it enters the sequence number of the message in the field 24c in the table entry and updates the time field 24e. At step 42, a logic unit determines whether the node is the destination node of the message. If it is, it exits the routine and passes the message to the next higher protocol layer. If it is not the destination node, and if the message is not a flood message (step 43), it checks its routing table at step 44 for an entry relating to the destination node. If it does not contain such an entry, it exits from the routine. If the cost table does contain an entry, the logic unit proceeds to step 45 where it determines from field 24c of the cost table entry corresponding to the originating node whether the message has been previously received by the node. If it has, the logic unit exits from the routine. If it is not, it proceeds to step 48 in which it ascertains whether the cost of a transmission from its node to the destination node is less than the value contained in the remaining cost field 22d in the message header. If the cost indicated in the corresponding cost table field 24b is greater than the remaining cost, the logic unit exits from the routine. If the cost is less than or equal to the remaining cost, the logic unit proceeds to step 50. Specifically, it decrements the remaining cost in the header field 22d by the amount of the cost of a transmission by its node and increments the value in the incurred cost field 22e by the same amount. At step 52, it then causes its transceiver 16 to retransmit the message with the updated frame 22.

Transmission of a flood message is similar to the procedure in FIG. 4. A message frame 22 is formed, with the message type field 22a indicating that the message is a flood message. The remaining cost field 22d can be set to the maximum value that the transmitting node will incur for a message to the designated recipient. (Alternatively, the field 22d can be set to zero, which indicates to nodes relaying the message that the remaining cost entry is to be ignored). Nodes receiving the message operate in accordance with the routine illustrated in FIG. 5, with the exception that they branch at step 43 and do not check their cost tables for entries relating to the destination node. With the sequence number checked at step 45, a node will not retransmit a flood message more than once.

When a destination node receives a message and transmits an acknowledgement the routing will follow the information contained in the cost tables of the intervening nodes, as updated during the transmission from the originating node to the destination node. When a flood message is received by a destination node, several copies will ordinarily be received from different routes. The destination node updates its cost table entry relating to the originating node in accordance with the received replica of the message that has the lowest incurred cost and then uses that information in transmissions to the originating node.

With the foregoing arrangement nodes can enter the network or change their locations without the use of setup messages of any kind. That is, entry or relocation is accomplished merely by the transmission of a message, which may be a message of the usual type transmitted by the node in the course of normal operations. The appropriate cost tables in the network are automatically updated to include entries that provide for routing back to that node. Thus, the network is not subject to the overhead of the transmission of routing information. Nor is it subject to breakdown from incorrect transmission of routing information. Furthermore, it is not adversely affected by single-node failure so long as each node has at least two immediate neighbors.

What is claimed is:

1. A network comprising a plurality of nodes, each node including transmitting means and receiving means, the transmitting means including:
A) a routing table containing a plurality of entries, each entry corresponding to another node in the network and containing the cost of transmission to that other node,
B) means for forming message frames for transmission of messages to destination nodes, each frame including:
 1. a message
 2. the identity of the destination node for the message,
 3. the identification of the node that originated the message, 4. the cost of conveying of the message to the destination node, and
5. the cost so far incurred in conveying of the message from the originating node to the destination node.

2. The network defined in claim 1 in which each node further includes means for receiving messages transmitted from other nodes, said receiving means including means for:

A) if the destination node identified in a received massage frame is not the identity of the node, and B) if the routing table in the node contains an entry, corresponding to the destination node, that indicates that the cost of the transmission to the destination node is less than the cost of conveying contained in the message frame;
1. updating the message frame by incrementing the incurred cost in the message frame by a relay cost associated with the receiving node;
2. updating the message frame by decrementing the cost of conveying the message frame to the destination by the relay cost; and
3. causing the message to be retransmitted from the node.

3. The system defined in claim 2 in which

A) each frame includes a sequence number corresponding to the sequence of messages transmitted from the originating node; and B) each routing entry table contains at least the most recent sequence number of messages received by the node from the node to which the table entry corresponds and C) each node includes means for inhibiting retransmission of a message in which the sequence number equals a sequence number contained in the routing table entry corresponding to the node identified in the message frame as the originating node.

* * * * *